US008225329B1

(12) United States Patent
Lynn (10) Patent No.: US 8,225,329 B1
(45) Date of Patent: Jul. 17, 2012

(54) TAIL SYNCHRONIZED FIFO FOR FAST USER SPACE PACKET ACCESS

(75) Inventor: Michael Lynn, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1224 days.

(21) Appl. No.: 11/854,777

(22) Filed: Sep. 13, 2007

(51) Int. Cl.
G06F 9/44 (2006.01)
G06F 13/28 (2006.01)
G06F 13/24 (2006.01)

(52) U.S. Cl. ............ 719/314; 710/22; 710/39; 710/47; 710/263; 710/308

(58) Field of Classification Search .................. 719/310, 719/314; 710/22, 47, 39, 263, 308; 711/112
See application file for complete search history.

(56) References Cited

U.S. PATENT DOCUMENTS

| 7,448,049 B1 * | 11/2008 | Xing ............................ 719/318 |
| 7,451,456 B2 * | 11/2008 | Andjelic ....................... 719/321 |
| 7,694,035 B2 * | 4/2010 | Chen et al. ...................... 710/22 |
| 7,761,687 B2 * | 7/2010 | Blumrich et al. ............... 712/11 |
| 7,873,964 B2 * | 1/2011 | Huang et al. .................. 719/314 |
| 7,984,180 B2 * | 7/2011 | Pope et al. ..................... 709/238 |
| 2005/0210479 A1 * | 9/2005 | Andjelic ....................... 719/321 |
| 2009/0003203 A1 * | 1/2009 | Chen et al. .................... 370/230 |
| 2009/0006296 A1 * | 1/2009 | Chen et al. ..................... 706/42 |
| 2009/0006666 A1 * | 1/2009 | Chen et al. ..................... 710/23 |
| 2009/0006808 A1 * | 1/2009 | Blumrich et al. ............... 712/12 |

OTHER PUBLICATIONS

Giacomoni et al. "FShm: High-Rate Frame Manipulation in Kernel and User-Space", Oct. 2006, pp. 1-14.*
Van Jacobson et al., "Speeding Up Networking", Precision I/O, Linux Conference, Australia Jan. 27, 2006, Dunedin, New Zealand, pp. 1-33 (print date: Mar. 21, 2012).

* cited by examiner

Primary Examiner — Van Nguyen
(74) Attorney, Agent, or Firm — Harrity & Harrity, LLP (57) ABSTRACT

A network device may include a line interface to receive and transmit data units, a memory including instructions associated with a user space and a kernel space that are executable by a processor, the user space including a first-in-first-out (FIFO) region for storing the data units and corresponding metadata, where the kernel space writes the data unit and the corresponding metadata to the FIFO region, the metadata including a next pointer that identifies a memory address for storing the next data unit in the FIFO region, a user space process determines whether to transmit or drop the data unit, the user space process being a single process, and the user space transmits the data unit from the FIFO region without involving the kernel space when the user space process issues a command.

15 Claims, 5 Drawing Sheets

TAIL SYNCHRONIZED FIFO FOR FAST USER SPACE PACKET ACCESS

BACKGROUND

Numerous network data unit handling schemes have been developed to improve the performance of data unit capture and transmission. For example, software improvements relating to kernel performance for moving data units from the kernel space to the user space have been developed. Alternatively, hardware improvements, directed to, for example, interrupt mitigation and prioritization have been developed. Despite these improvements, latency stemming from context switching, locking and other synchronizations may still exist, reducing the efficiency of transferring data units through a network.

SUMMARY

According to one aspect, a network device may include a line interface to receive and transmit data units, a memory including instructions associated with a user space and a kernel space that are executable by a processor. The user space may include a first-in-first-out (FIFO) region for storing the data units and corresponding metadata. The kernel space may write the data unit and the corresponding metadata to the FIFO region, where the metadata may include a next pointer that identifies a memory address for storing the next data unit in the FIFO region. A user space process may determine whether to transmit or drop the data unit, where the user space process may be a single process. The user space may transmit the data unit from the FIFO region without involving the kernel space when the user space process issues a command.

According to another aspect, a network device may include a line interface to receive and transmit data units and a memory that may include a user space and a kernel space. The user space may include a first-in-first-out (FIFO) queue for storing data units and corresponding metadata. A processor may write one of the data units and the corresponding metadata to the FIFO queue based on the kernel space, where the metadata may include a next pointer to point to a region of the FIFO queue to store a next one of the data units. The processor may read the data unit according to a user space process and determine whether to transmit the data unit or drop the data unit based on one or more rules associated with the user space process. The processor may issue a direct memory access command, based on the user space process, to the line interface to transmit the data unit directly from the FIFO queue when the data unit conforms to the one or more rules.

According to yet another aspect, a method operable in a network device, the method may include capturing a data unit, assigning metadata to the data unit, writing the data unit and the metadata to a first-in-first-out (FIFO) queue in a user space, where the metadata may include a next pointer to a memory region of the FIFO queue for storing a next data unit, writing a pointer to the next pointer in a kernel space, inspecting the data unit based on a user space process, and transmitting the data unit directly from the FIFO queue without involving the kernel space when the user space process issues a command.

According to another aspect, a device may include means for capturing data units, means for populating data unit and metadata in a first-in-first-out (FIFO) queue of a user space, means for inspecting the data units in a FIFO fashion based on the metadata, and means for transmitting the data units directly from the FIFO queue based on a user space process command.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings.

DETAILED DESCRIPTION

The following detailed description refers to the accompanying drawings. The same reference numbers in different drawings may identify the same or similar elements. The term "data unit," as used herein, is intended to be broadly interpreted to include a datagram, a packet, a frame, or any other type of delivery container.

Figure 1:
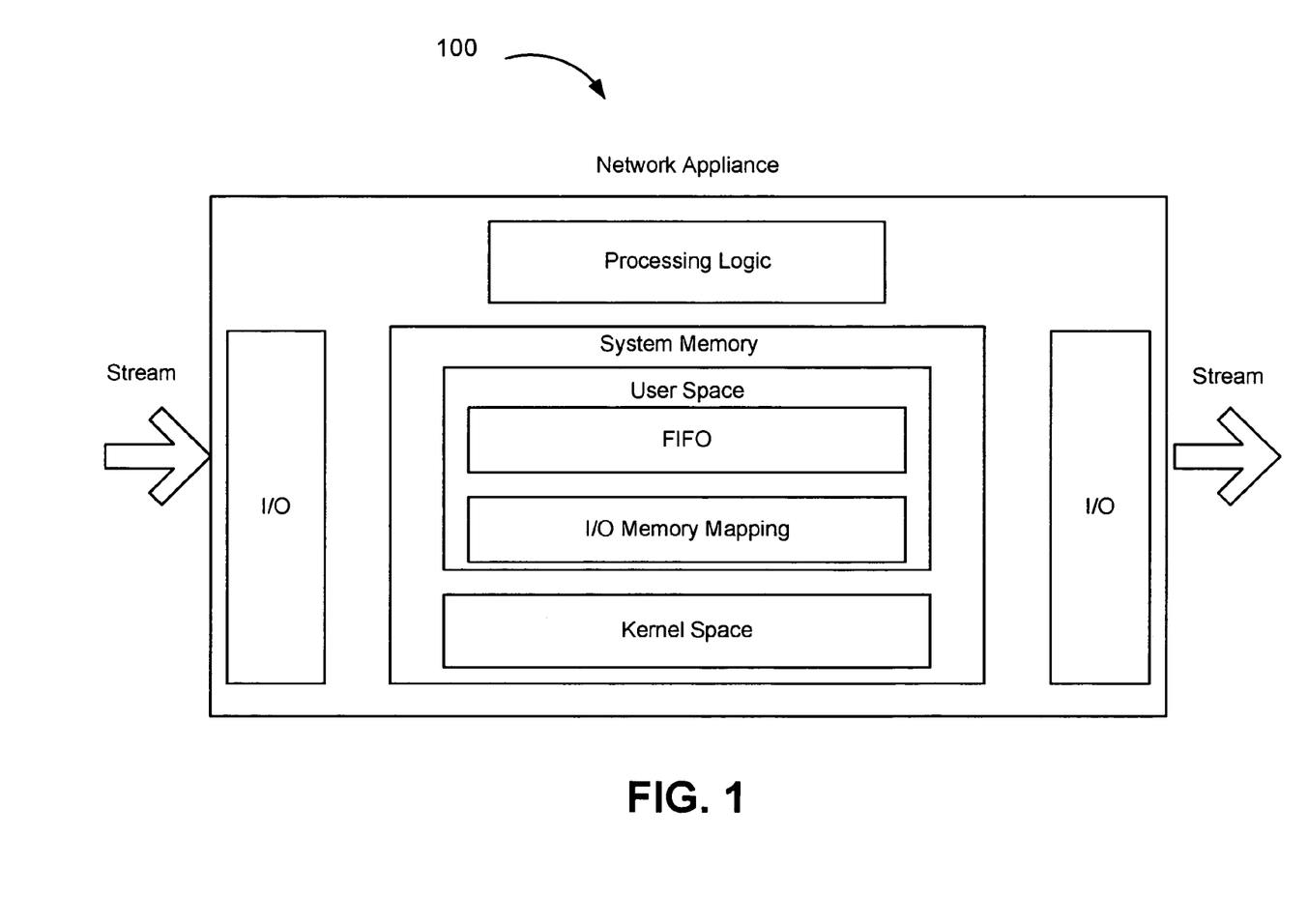
FIG. 1 is a diagram illustrating a concept described herein.

FIG. 1 is a diagram illustrating a concept described herein. As illustrated in concept 100, a network appliance, such as a security device, may include, among other things, input/output (I/O) interfaces, processing logic, and system memory. The system memory may include user space and kernel space. User space may include a first-in-first-out (FIFO) queue, as well as a mapping of I/O memory regions. A stream of data units may be transmitted through the network appliance before delivery to their destination.

As a data unit enters the network appliance, metadata may be assigned to the data unit. The metadata may include next pointer information. Kernel space may write the metadata and data unit into user space, such as into the FIFO queue. User space may read the data unit and metadata, and perform, for example, a user space process to inspect the data unit. The user space process may be a single task process. When a data unit is determined to be non-malicious, user space may issue a DMA command to the I/O interface to transmit the data unit from user space. User space may inspect a next data unit based on the next pointer. That is, the next pointer may point to a memory region where kernel space wrote the next data unit.

As a result of the foregoing, latency associated with data unit capture and forwarding may be significantly reduced. For example, in this configuration, there is zero-copy operation since data unit memory is mapped into user space. Additionally, latency associated with context switching is circumvented. For example, since I/O memory regions may be mapped into user space, user space may command the I/O interface to transmit a data unit from user space without kernel mode context switching occurring. Further, latency associated with process synchronization is minimized. That is, since the user space process is a single task process, locking and blocking as a result of contention is avoided. Additional latency issues may be avoided, as will be described below As described herein, a capture and transmission system having a higher throughput compared to other capture and transmission systems may be realized by providing an expeditious and versatile kernel to user space inter-process communication (IPC) channel.

Exemplary Environment

Figure 2:
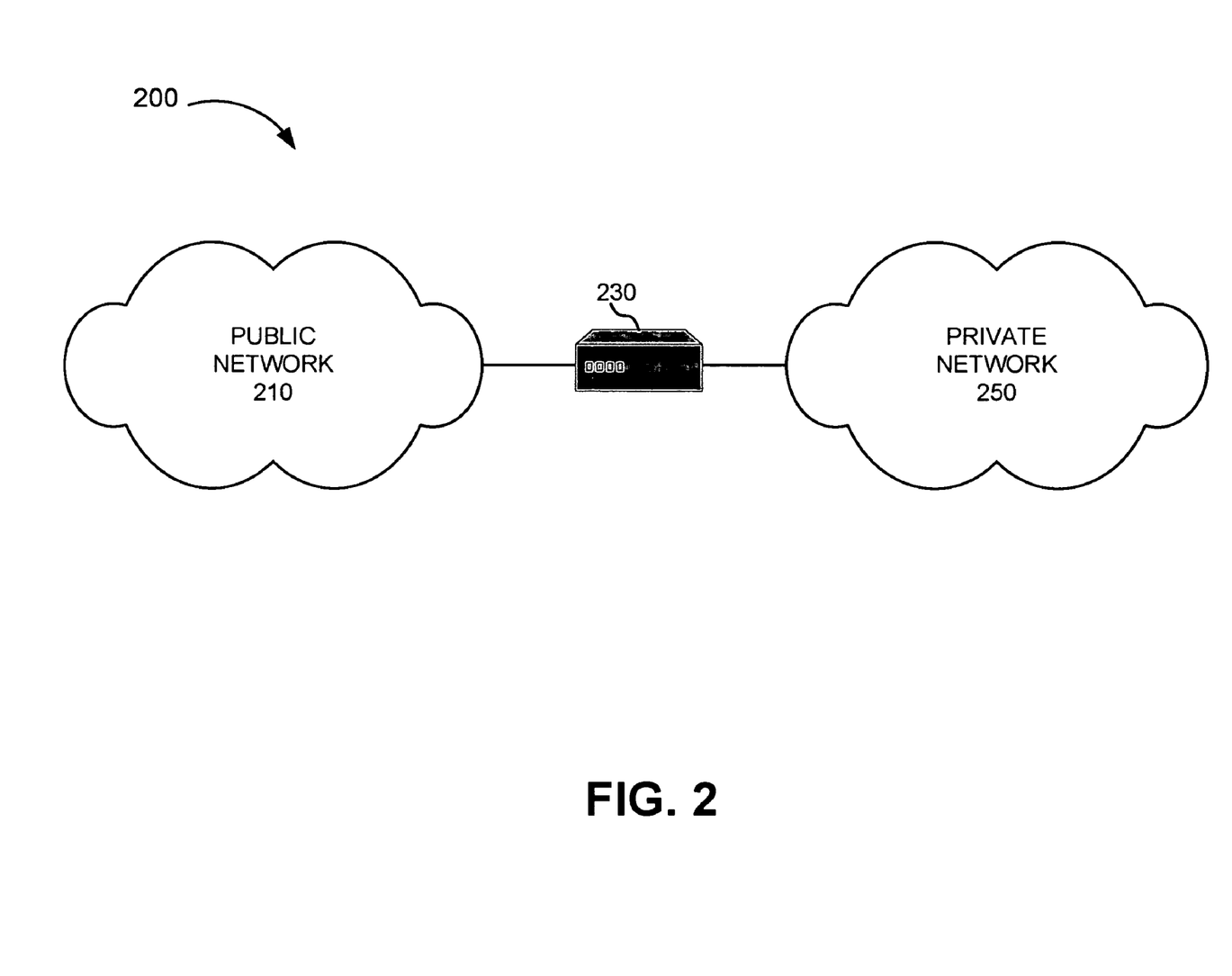
FIG. 2 is a diagram illustrating an exemplary environment in which concepts described herein may be implemented.

FIG. 2 is a diagram illustrating an exemplary environment in which concepts described herein may be implemented. As illustrated, environment 200 may include a public network 210, a security device 230, and a private network 250. The connections of environment 200 may be, for example, wired or wireless. Further, the connections between the exemplary components depicted in FIG. 2 may be direct or indirect.

Public network 210 may include, for example, the Internet, an Intranet, a local area network (LAN), a wide area network (WAN), a wireless network, a telephone network (e.g., a Public Switched Telephone Network (PSTN)), any other type of network, or a combination of networks. Public network 210 may include client computing stations, such as computing devices of end-users.

Security device 230 may include any device that includes network security capabilities. For example, security device 230 may include an intrusion, detection and prevention (IDP) system or a firewall.

Private network 250 may include, for example, an Intranet, a local area network (LAN), any other type of network, or a combination of networks. Private network 250 may include client computing stations, such as computing devices of end-users.

Although FIG. 2 illustrates exemplary components of environment 200, in other implementations fewer, additional, or different components may be utilized. For example, one or more nodes in environment 200 may be distributed into a plurality of devices. Additionally, or alternatively, security device 230 may not include network security capabilities. That is, security device 230 may be any network appliance that includes data capture/dispatching capability.

Security Device

Figure 3:
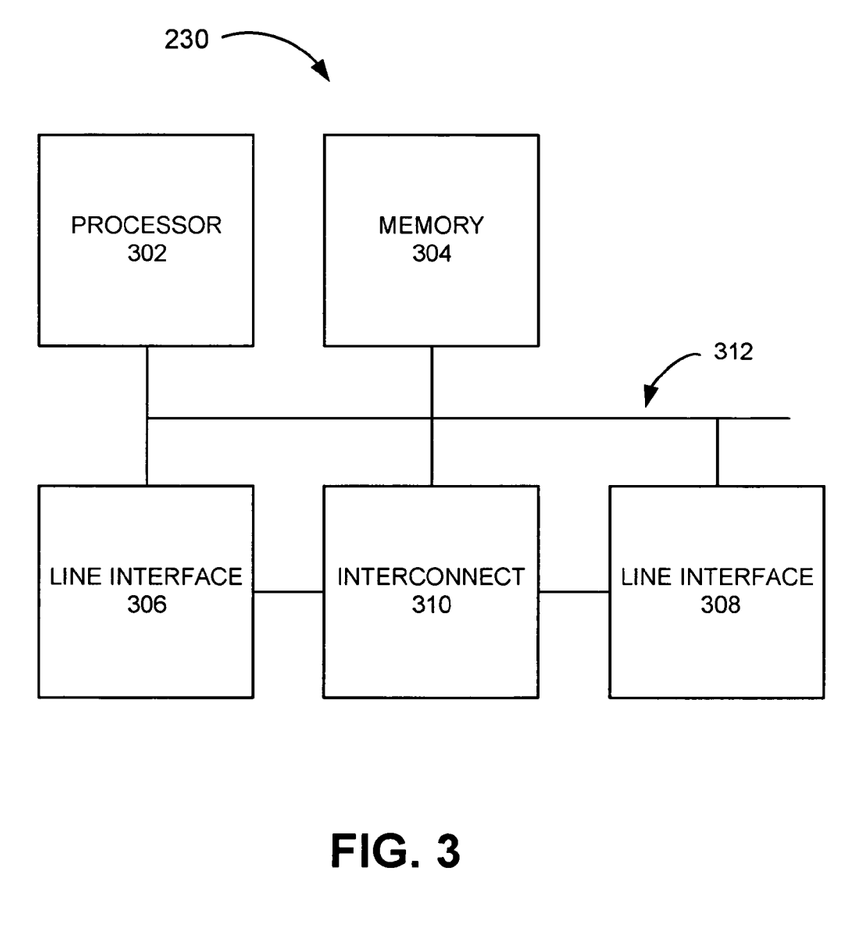
FIG. 3 is a diagram illustrating exemplary components of the security device depicted in FIG. 2.

FIG. 3 is a diagram illustrating exemplary components of the security device depicted in FIG. 2. As illustrated, security device 230 may include a processor 302, a memory 304, a line interface 306, a line interface 308, an interconnect 310, and a bus 312.

Processor 302 may include one or more processors, microprocessors, and/or processing logic that may interpret and execute instructions. The term "logic," as used herein, is intended to be broadly interpreted to include hardware, software, and/or a combination of hardware and software. Memory 304 may include static memory, such as read only memory (ROM), dynamic memory, such as random access memory (RAM), and/or onboard cache, for storing data and machine-readable instructions. In some implementations, memory 304 may also include storage devices, such as a floppy disk, a CD ROM, a CD read/write (R/W) disc, and/or flash memory, as well as other types of storage devices.

Line interfaces 306 and 308 may include any devices for transceiving incoming/outgoing data units to/from a network, such public network 210, and for transceiving incoming/outgoing data units to/from a network, such as private network 250. For example, line interface 306 and/or line interface 308 may include a network interface card (NIC) that includes a application-specific integrated circuit (ASIC). Line interfaces 306 and 308 each may contain a plurality of line interfaces to handle multiple flows.

Interconnect 310 may include switches for conveying an incoming data unit from line interface 306 to line interface 308 based on a data unit destination and stored path information. For example, interconnect 310 may include a communication bus or a switching fabric. Bus 312 may include a path that permits communication among the components of security device 230.

Security device 230 may perform certain operations, as described in detail below. Security device 230 may perform these operations in response to processor 302 executing software instructions contained in a computer-readable medium, such as memory 304. A computer-readable medium may be defined as a physical or logical memory device and/or carrier wave. The software instructions may be read into memory 304 from another computer-readable medium, such as from another device via line interfaces 306 and/or 308. The software instructions contained in memory 304 may cause processor 302 to perform processes that will be described later. Alternatively, hardwired circuitry may be used in place of or in combination with software instructions to implement processes as described herein. Thus, implementations as described herein are not limited to any specific combination of hardware circuitry and software.

Although FIG. 3 illustrates exemplary components of security device 230, in other implementations fewer, additional, or different components may be utilized. For example, security device 230 may include a display or other types of input/output devices. Additionally, in other implementations, functionalities of some components of security device 230 may be incorporated into other components of security device 230. For example, part of processor 302 and/or part of memory 304 may be included in line interface 306 and/or line interface 308. Further, in other implementations, the configuration of the components, as depicted in FIG. 3, may be different.

Figure 4:
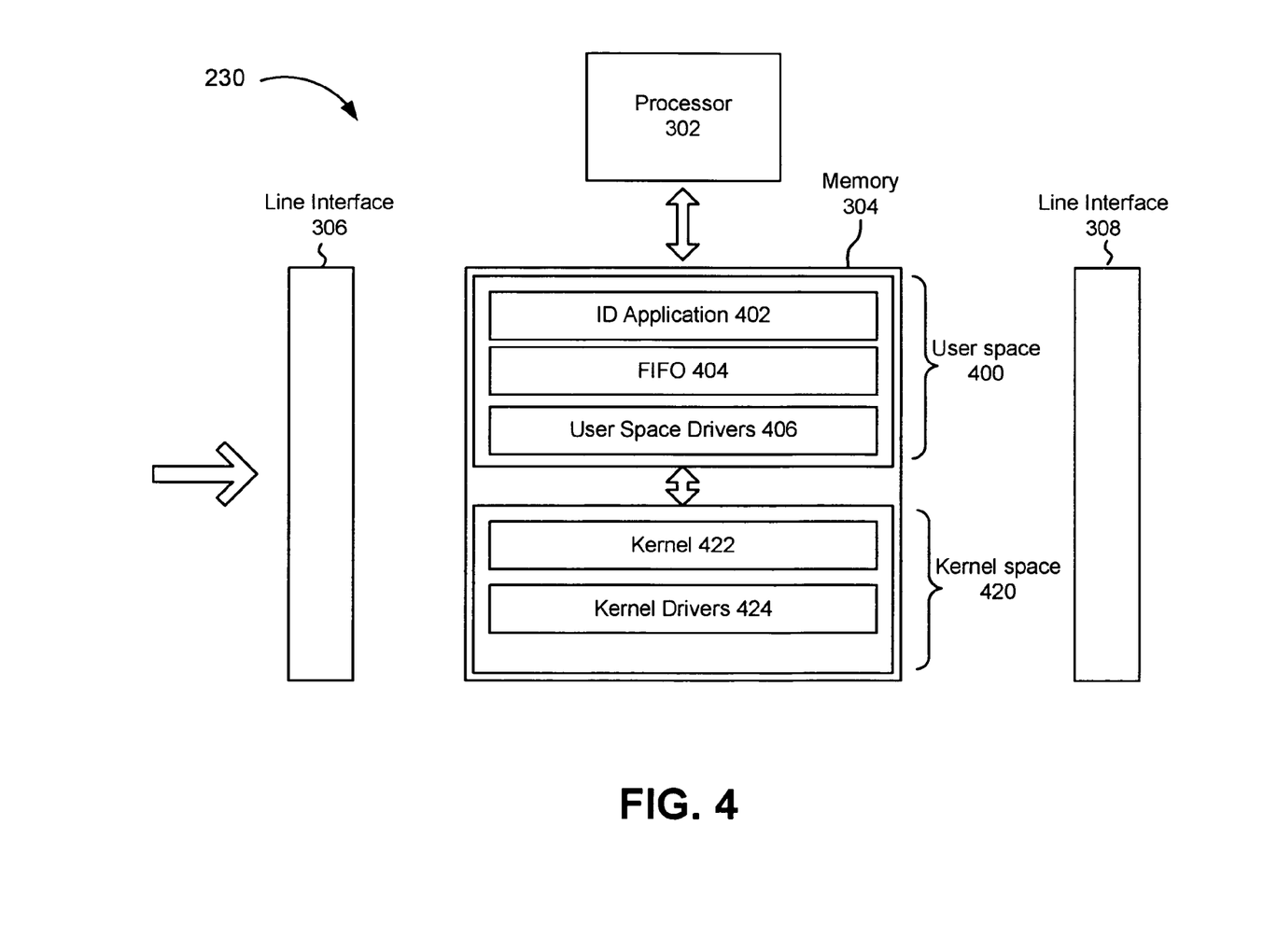
FIG. 4 is a diagram of exemplary components in the memory depicted in FIG. 3.

FIG. 4 is a diagram illustrating exemplary components in the memory depicted in FIG. 3. In addition to the components previously described, memory 304 may include a user space 400 and a kernel space 420. User space 400 may include an intrusion detection (ID) application 402, a FIFO 404, and user space drivers 406. Kernel space 420 may include a kernel 422 and kernel drivers 424. Although not illustrated, user space 400 and kernel space 420 may include various libraries (e.g., standard C library and/or Linux modules) that operate in conjunction with the components described below to perform data unit capture and transmission.

User space 400 may include an area of memory 304 where user processes may operate, as described herein. ID application 402 may be any component that analyzes a data unit. For example, ID application 402 may inspect the content of a data unit (e.g., header and payload) for a known attack or other intrusion signature. ID application 402 may compare the content of the data unit based on one or more detection rules and/or security policies. In one implementation, the detection rules may be stored as character strings in a database or a table. When there is a match with a known attack signature, an alert may be generated and the data unit may be dropped. In other instances, when there is no match and/or the data unit is determined to be non-malicious, the data unit may be forwarded toward its destination. In one implementation, ID application 402 may be a single task process.

FIFO 404 may include a memory that uses a first-in, first-out queuing method. For example, FIFO 404 may include a queue having multiple memory regions or a linked list. Data units may be written into empty memory regions and may be serviced in the order that the data units were populated into the queue.

User space drivers 406 may be any component that permits a user process to interact with various components of security device 230, such as line interfaces 306, 308, memory 304, bus 312, etc. User space drivers 406 may provide user space 400 with various functions, such as read device, open device, close device, etc., which may be employed during the operation of security device 230.

Kernel space 420 may include an area of memory 304 where the operating system (OS) and other services and processes may execute. Kernel 422 may include an OS that provides, among other things, memory management, process management, and/or I/O management.

Kernel drivers 424 may be any component that permits a kernel process to interact with various components of security device 230, such as line interfaces 306, 308, memory 304, bus 312, etc. Kernel drivers 424 may provider kernel space 420 with various functions, such as write device, open device, close device, load, etc., which may be employed during the operation of security device 230.

Although FIG. 4 illustrates exemplary components of security device 230, in other implementations fewer, additional, or different components may be utilized.

Exemplary Processing

Figure 5:
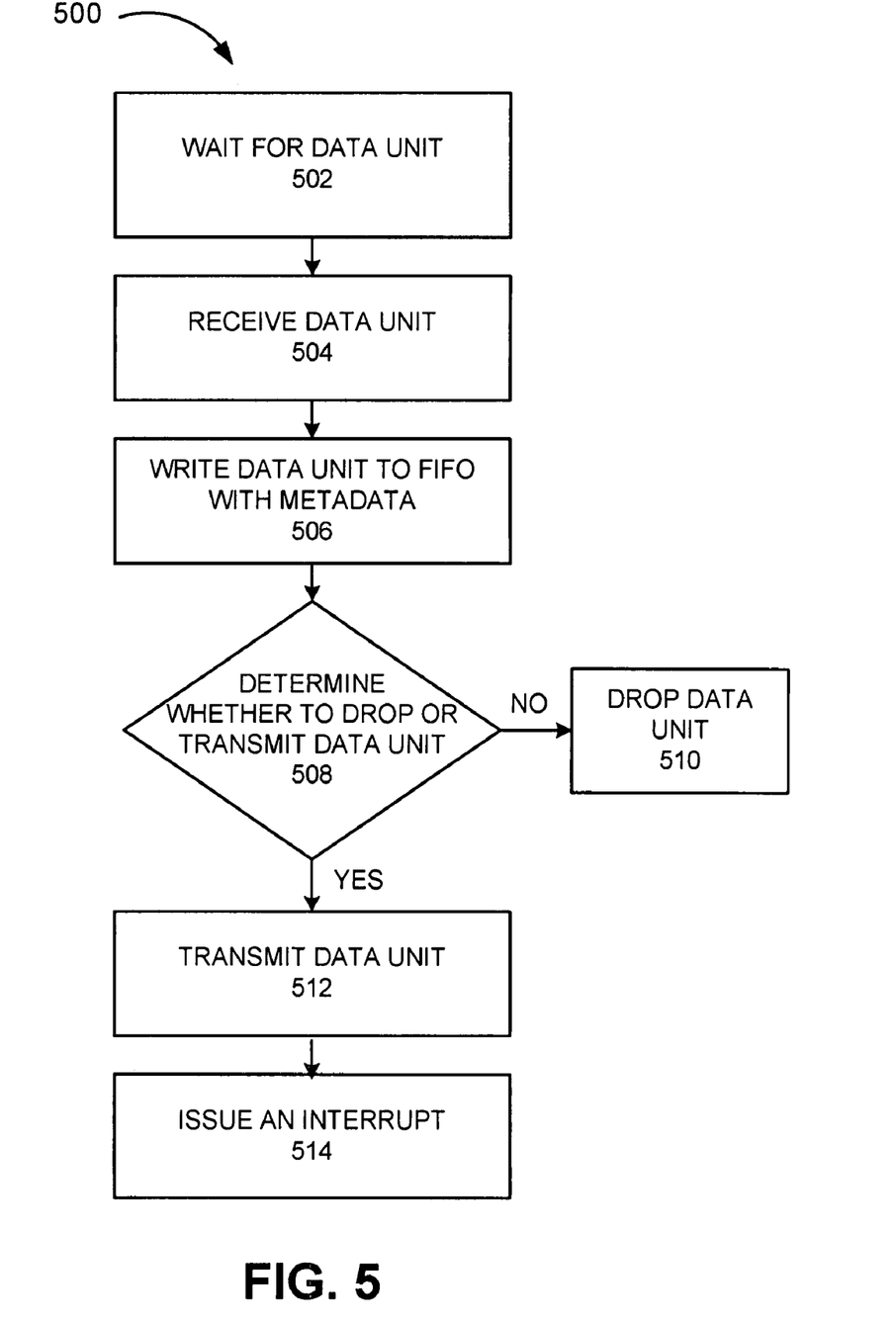
FIG. 5 is a flow chart of an exemplary process for data unit capture and transmission.

FIG. 5 is a flow chart of an exemplary process for data unit capture and transmission. Exemplary process 500 is described below in relation to security device 230. For purposes of discussion, an initial state for security device 230 will be that there are no data units. Thereafter, the flow chart depicts the processing of an arriving data unit.

Process 500 may begin by waiting for a data unit (Block 502). At an initial state, such as during boot-up, user space 400 may issue a system call to kernel space 420 requesting a data unit. For purposes of discussion, a data unit has not arrived yet, so user space 400 may transition into a sleep mode.

A data unit may be received (Block 504). When a data unit is received at a line interface, such as line interface 306, kernel drivers 424 may manage the data unit via line interface 306. Kernel drivers 424 may waken user space 400, such as ID application 402 and/or other components of user space 400.

The data unit and metadata may be written to the FIFO (Block 506). Kernel 422 may generate metadata to be associated with the received data unit. The metadata may include, for example, what line interface the data unit came from, the size of the data unit, an offset to the payload, and/or a status indicator for a check sum (e.g., if line interface 306 supports check summing). Additionally, kernel 422 may include a next pointer as metadata. The next pointer signifies a memory address to the next data unit. In this instance, since the data unit may be a first data unit (e.g., first data unit in FIFO 404), the next pointer may have a null value. Kernel drivers 424 may write the data unit and metadata in FIFO 404 of user space 400. Kernel 422 may also respond to the system call of user space 440 (e.g., of Block 502) and provide user space 400 with a pointer to the first data unit.

Kernel 422 may maintain a pointer that points to the next pointer (metadata) of the first data unit. Kernel 422 may store the pointer in kernel space 420. When a next data unit arrives, kernel drivers 424 may write the next data unit in FIFO 404. Kernel 422 may refer to the pointer in kernel space 420 and write to the next pointer of the first data unit within FIFO 404. That is, kernel 22 may write the memory address of the next data unit and corresponding metadata to the next pointer of the first data unit in FIFO 404. Thus, user space 400 may read the next pointer of the first data unit to locate the next data unit and corresponding metadata stored in FIFO 404. In this implementation, once kernel 422 writes a value (i.e., a memory address) to the next pointer of a data unit, access to the data unit is no longer available to kernel space 420. That is, user space 400 owns the data unit.

In a similar instance, when a last data unit arrives in FIFO 404, the next pointer of the last data unit may have a null value. In this case, user space 400 may issue a system call to kernel space 420 for a next pointer value. Kernel space 420 may respond to the system call when a data unit arrives. Accordingly, other than instances associated with before a first data unit arrives and after a last data unit arrives, latency from synchronization may be negated. Moreover, these instances that do introduce latency from synchronization have been situated at times when processing requirements are relatively low.

A determination whether to transmit or drop the data unit is made (Block 508). For example, ID application 402 may inspect the first data unit and metadata. ID application 402 may determine whether the first data unit contains any known attacks based on detection rules. For example, ID application 402 may compare the first data unit to attack signatures residing in, for example, a signature database or a table. The signature database may include a set of patterns, such as character strings, which ID application 402 may compare to various portions of the first data unit, such as the header, payload, and/or trailer.

In one implementation, ID application 402 may operate as a single task process. In this case, process synchronization may be avoided since contention is low or non-existent. For example, in a network intrusion detection and/or prevention system, the task of deciding whether to drop a data unit or forward a data unit may involve a simple process.

The data unit may be dropped (Block 510). When ID application 402 determines that a data unit is malicious, ID application 402 may drop the data unit. In one implementation, user space 400 may create, for example, a circular, doubly linked list, by adding references to the dropped packets. In this way, user space 400 may still operate as a zero copy system. Once the number of dropped packets reaches a certain threshold, user space 400 may make a system call to kernel space 420 to have the memory space occupied by the dropped packets to be released.

The data unit may be transmitted (Block 512). When ID application 402 determines that a data unit is non-malicious, ID application 402 may forward the data unit toward its destination. User space 400 may include a memory mapped I/O region relating to a line interface. User space drivers 406 may issue a DMA command to transmit the data unit directly from user space 400. In this way, latency associated with mode switching between user mode to kernel mode to dispatch the data unit may be circumvented. That is, user space drivers 406 may supplant kernel drivers 424 to have the data unit transmitted by a line interface.

An interrupt may be issued (Block 514). When the transmission of the data unit is complete, line interface 308 may issue an interrupt to kernel 422 for purposes of memory re-allocation. For example, line interface 308 may issue a transmit-complete or a transmit-error message. Upon line interface 308 issuing the transmit-complete or the transmit-error message, the data unit may belong to kernel 422.

In one implementation, reference counts may be associated with the data unit. In one implementation, the reference count may be initialized to, for example, one. When the transmit-complete message is issued, the transmit handler may decrement the reference count. When the reference count value is zero, kernel 422 may release the memory address associated with the transmitted data unit for re-use. However, when the reference count is not zero, kernel 422 may not release the corresponding memory region since other processes may still be referencing the data unit.

Kernel 422 may receive an interrupt based on a transmit-complete message or a transmit-error message, regardless of whether the reference count is zero or not zero. In one implementation, to minimize interrupts, kernel 422 may receive a first interrupt, and thereafter disable the interrupts from line interface 308 for a period of time in order for the releasable memory regions to accumulate. In this instance, the first interrupt may trigger a scheduling of a soft interrupt service routine in kernel 422. The soft interrupt service routine may include a polling operation that allows all the memory regions to be released for re-use. Thus, after a waiting period, kernel 422 may service the accumulated interrupts and release the corresponding memory regions.

As subsequent data units arrive, kernel space 420 may write to FIFO 404 and user space 400 may read the next pointer value. When the next pointer value is null, ID application 402 knows that a subsequent data unit has not arrived. Conversely, when the next pointer is not null, ID application 402 may locate and service the received data unit. In this regard, an ordering of reads and writes may be maintained throughout the processing of incoming data units while averting undesirable latency associated with synchronization. Further, in this framework, a single user space process may service traffic from multiple line interfaces, while permitting access to various other components of security device 230 (e.g., kernel space 420, line interfaces 306, 308, etc.), since the data unit memory region is in user space 400.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

The description of FIG. 3 above includes a discussion of software instructions contained on computer-readable media. Alternatively, in each of these implementations, hardwired circuitry may be used in place of or in combination with software instructions to implement processes described herein. Thus, implementations described herein are not limited to any specific combination of hardware circuitry and software.

In addition, while a series of blocks have been described with regard to the process illustrated in FIG. 5, the order of the blocks may be modified in other implementations. Further, non-dependent blocks may represent blocks that can be performed in parallel. Further, it may be possible to omit blocks within the process of FIG. 5.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
a line interface to receive and transmit data units;
a memory including a user space and a kernel space, the user space including a first-in-first-out (FIFO) queue to store the data units and corresponding metadata; and
a processor to:
write one of the data units and the corresponding metadata to the FIFO queue based on the kernel space, the metadata including a particular pointer to point to a region of the FIFO queue to store another of the data units;
read the data unit according to a user space process associated with the user space;
determine whether to transmit the data unit or drop the data unit based on one or more rules associated with the user space process;
store, in the kernel space, a pointer that points to the particular pointer; and
issue a direct memory access command, based on the user space process, to the line interface to transmit the data unit directly from the FIFO queue when the data unit conforms to the one or more rules,
where the line interface issues an interrupt to the kernel space when the data unit is transmitted,
where the processor is further to:
disable, via the kernel space, additional interrupts from the line interface after the interrupt is received, and
cause the kernel space to queue a soft interrupt to service transmitted one or more data units based on a polling routine.

2. The network device of claim 1, where the processor issues, based on the user space, a system call to the kernel space when the particular pointer has a null value.

3. The network device of claim 1, where the particular pointer has
a null value when the FIFO queue is idle.

4. The network device of claim 1, where the user space process is a single task process.

5. The network device of claim 1, where the memory further stores attack signatures, and where the one or more rules comprise:
a first rule to compare the data unit to the attack signatures, and
a second rule to determine whether to transmit the data unit or drop the data unit based on the comparison of the data unit to the attack signatures.

6. The network device of claim 1, where the processor is further to update, via a process in the kernel space and based on the pointer, the particular pointer when the other data unit is received.

7. A network device comprising:
a line interface to receive and transmit data units;
a memory including a user space and a kernel space, the user space including a first-in-first-out (FIFO) queue to store the data units and corresponding metadata; and a processor to:
write one of the data units and the corresponding metadata to the FIFO queue based on the kernel space, the metadata including a particular pointer to point to a region of the FIFO queue to store another of the data units;
read the data unit according to a user space process;
determine whether to transmit the data unit or drop the data unit based on one or more rules associated with the user space process;
store a pointer, in the kernel space, that points to the particular pointer;
issue a direct memory access command, based on the user space process, to the line interface to transmit the data unit directly from the FIFO queue when the data unit conforms to the one or more rules,
where the line interface issues an interrupt to the kernel space when the data unit is transmitted, and
where the processor is further to:
disable, via the kernel space, additional interrupts from the line interface after the interrupt is received,
queue, in the kernel space, a soft interrupt to service the transmitted data units based on a polling routine, and
reallocate memory, in the kernel space, associated with the transmitted data unit when a reference count value corresponding to the transmitted data unit represents an absence of a process reference.

8. The network device of claim 7, where the processor is further to:
receive another data unit, determine, using the user space process, whether to drop the other data unit,
store the other data unit in a dropped queue in the user space the data unit is to be dropped, and
issue an interrupt to the kernel space when the dropped queue accumulates a particular number of data units.

9. A method performed by a network device, the method comprising:
receiving a data unit;
assigning metadata to the data unit;
writing the data unit and the metadata to a first-in-first-out (FIFO) queue in a user space of the network device, the metadata including a particular pointer to a memory region of the FIFO queue for storing another data unit;
reading the data unit according to a user space process;
determining whether to transmit the data unit or drop the data unit based on one or more rules associated with the user space process;
writing a pointer to the particular pointer in a kernel space of the network device;
inspecting the data unit based on the user space process associated with the user space; and
transmitting the data unit directly from the FIFO without involving the kernel space when the user space process issues a command,
where transmitting the data unit comprises:
issuing a direct memory access command to a line interface of the network device, where the direct memory access command enables the line interface to acquire the data unit from the FIFO,
where issuing the direct memory access command comprises:
issuing, from the line interface, an interrupt to the kernel in response to transmitting the data unit; and
triggering a service routine to poll the line interface based on the interrupt, and
where triggering the service routine includes comprises:
queuing additional interrupts associated with the line;
servicing the queued additional interrupts; and
reallocating, based on the serviced interrupts, memory spaces corresponding to transmitted data units.

10. The method of claim 9, further comprising:
storing, based on information in the pointer, the other data unit.

11. The method of claim 9, where inspecting the data unit comprises:
performing, by the user space process, a single task process to determine whether the data unit is malicious, and
where the data unit is transmitted from the FIFO in response to determining, by the single task process, that the data unit is not malicious.

12. The method of claim 9, further comprising:
determining, by the user space process, whether to drop the data unit, where the command is associated with not dropping the data unit;
storing the data unit in a dropped queue in the user space when the user space process determines that the data unit is to be dropped; and
issuing an interrupt to the kernel space when the dropped queue accumulates a particular number of data units.

13. The method of claim 9, further comprising:
inspecting the other data unit based on information associated with the particular pointer.

14. The method of claim 9, where the data unit is included in
a plurality of data units, and
where when the data unit is a first data unit or a last data unit of a plurality of data units, the pointer to the particular pointer is a null pointer.

15. The method of claim 14, further comprising:
issuing, via the user space, a system call to the kernel space when the particular pointer is the null pointer.

* * * * *